United States Patent
Trinon et al.

(10) Patent No.: US 8,862,631 B2
(45) Date of Patent: Oct. 14, 2014

(54) SYSTEM AND METHOD FOR BUILDING BUSINESS SERVICE MODEL

(75) Inventors: Jean-Marc Trinon, Luik (BE); Troy Cline, Leander, TX (US); Walt Giroir, Round Rock, TX (US); Shane Crawford, Austin, TX (US)

(73) Assignee: BMC Software, Inc., Houston, TX (US)

( * ) Notice: Subject to any disclaimer, the term of this patent is extended or adjusted under 35 U.S.C. 154(b) by 1703 days.

(21) Appl. No.: 11/316,025

(22) Filed: Dec. 21, 2005

(65) Prior Publication Data

US 2006/0161466 A1    Jul. 20, 2006

Related U.S. Application Data

(60) Provisional application No. 60/637,929, filed on Dec. 21, 2004.

(51) Int. Cl.
*G06F 17/30* (2006.01)

(52) U.S. Cl.
USPC .......................... 707/803; 707/805; 709/223

(58) Field of Classification Search
USPC .................... 707/1, 10, 104.1, 803, 804, 805; 709/223
See application file for complete search history.

(56) References Cited

U.S. PATENT DOCUMENTS

| | | | |
|---|---|---|---|
| 5,864,865 A | 1/1999 | Lakis | |
| 6,670,973 B1 | 12/2003 | Hill et al. | |
| 6,807,667 B1 | 10/2004 | Bar et al. | |
| 6,983,321 B2 | 1/2006 | Trinon et al. | |
| 7,145,898 B1 | 12/2006 | Elliott | |
| 7,478,404 B1 * | 1/2009 | Campbell | 719/318 |
| 2002/0052941 A1 * | 5/2002 | Patterson | 709/222 |
| 2002/0138571 A1 | 9/2002 | Trinon et al. | |
| 2002/0143788 A1 * | 10/2002 | Hermann et al. | 707/103 R |
| 2003/0085931 A1 | 5/2003 | Card et al. | |
| 2004/0024571 A1 | 2/2004 | Trinon et al. | |
| 2004/0024627 A1 | 2/2004 | Keener | |
| 2005/0283445 A1 | 12/2005 | Trinon et al. | |
| 2006/0031225 A1 * | 2/2006 | Palmeri et al. | 707/10 |
| 2006/0136459 A1 | 6/2006 | Trinon et al. | |
| 2006/0136585 A1 | 6/2006 | Mayfield et al. | |

FOREIGN PATENT DOCUMENTS

JP    408329156 A    12/1996

* cited by examiner

*Primary Examiner* — Vincent F Boccio

(57) ABSTRACT

A modeling system has a database that stores information of resources of a computer network service. A server f has a graphical user interface application for creating and editing service models. The application receives user-entered search criteria and searches information in the database based on the criteria. The search criteria can include a name, type, attribute, and other information of the resources. In addition, the search criteria can be a user-entered search query entered that has one or more logical or Boolean conditions relating resource attributes to attribute values. Using information obtained through searching, the application is used to create at least a portion of a service model of the computer network service. Once created, the application is used to initiate publishing of at least a portion of the service model to one or more impact managers of the computer network service.

33 Claims, 11 Drawing Sheets

CREATE COMPONENT

| GENERAL | STATUS AND ALIAS | PERMISSIONS | PRIORITY AND COST | OTHER |

— 510
— 512
— 514
— 516
— 518

COMPONENT TYPE:

- ○ ASSET GROUP
- ○ GENERIC GROUP
- ● BUSINESS PROCESS
- ○ GEOGROPHY
- ○ CITY
- ○ REGION
- ○ SITE
- ○ GROUP
- ○ ORGANIZATION
- ○ SERVICE

— 520

COMPONENT NAME: [ ]

DESCRIPTION [ ]

OWNER
NAME: [ ]
CONTACT: [ ]

— 530

CELL (REQUIRED FOR PUBLISHING) [ ▷ ] — 540

COMPONENT IS  — 550
● NOT IN MODEL
○ IN MODEL

[ OK ]  [ CANCEL ]

FIG. 5

SYSTEM AND METHOD FOR BUILDING BUSINESS SERVICE MODEL

CROSS-REFERENCE TO RELATED APPLICATIONS

This is a non-provisional of U.S. Patent Application Ser. No. 60/637,929, filed 21 Dec. 2004 and entitled "Business Service Management Architecture," which is incorporated herein by reference in its entirety and to which priority is claimed.

BACKGROUND OF THE DISCLOSURE

The subject matter of the present disclosure generally relates to an architecture for a Business Service and, more particularly relates, to a system and method of managing a Business Service.

Business Service Management ("BSM") is a dynamic Information Technology ("IT") management strategy supported by technology, people, and processes. BSM enables organizations to align their IT and help desk operations to business goals and business services. A business service consists of a number of resources, such as management processes, hardware, software, facilities, and people, for example, which help satisfy business needs or objectives. Using a BSM approach, IT staff can monitor, manage, and improve their IT systems and applications that support critical business processes. BSM also enables companies to understand and predict how technology changes will affect their business and how changes in the business affect the IT infrastructure.

As suggested above, one goal of BSM is to assess the impact that problems reported on some resources (e.g., a network router, file server, or database application) may have on other resources of a higher level (e.g., business processes or services). To do that, a special type of "relationship" is used to describe the operational link between two resources: the impact relationship. An impact relationship is created between a first resource identified as the "provider" and another resource identified as the "consumer." While there may be many different types of impact relationships, all impact relationships represent a dependency from the consumer on the provider.

Modeling a business service is one way to organize the impact relationships between resources. It will be appreciated that a business service can encompass thousands of resources and relationships so that modeling the business service can be challenging. In large computing environments or enterprises, for example, multiple applications may be used to "discover" or detect resources and components associated with the computing environment. In such situations, a single resource may have been discovered and reported to an enterprise's configuration management system multiple times, which can make modeling a business service difficult. In addition, discovery applications may not identify all the resources and/or operational relationships between various resources in the large computing environments or enterprises. Thus, it would be beneficial to provide a mechanism to facilitate modeling of resources and relationships of a computing system.

In addition to the difficulties involved with modeling a business service, difficulties occur when changes or modifications are to be made to a model of the business service. Typically, portions of the business service model are stored locally at managers that detect and report events that may have an impact on business processes. These managers are software components distributed throughout an enterprise computing system and are referred to as Impact Managers or cells. To make changes or updates to the service model, a user, such as a network administrator, typically must individually access the portions of the service model stored locally at the Impact Managers and make separate changes at the Impact Managers.

The subject matter of the present disclosure is directed to overcoming, or at least reducing the effects of, one or more of the problems set forth above.

SUMMARY

A modeling system has a database that stores information pertaining to resources of a computer network service. A server is functionally coupled to the database and has a graphical user interface application for creating and editing service models. The application receives user-entered search criteria and searches information in the database based on the criteria. The search criteria can include a name, type, or attribute of the resource. In addition, the search criteria can be based on whether the resource has been previously published, who was the last editor, and when was the last publishing date. Furthermore, the search criteria can be a search query entered by the user. The search query has one or more logical or Boolean conditions relating resource attributes to attribute values. Using information obtained through searching, the application is used to create at least a portion of a service model of the computer network service. Once created, the application is used to initiate publishing of at least a portion of the service model to one or more impact managers of the computer network service.

BRIEF DESCRIPTION OF THE DRAWINGS

FIG. 5 illustrates a screen of the Service Model Editor for creating a component.

DETAILED DESCRIPTION

The following descriptions are presented to enable any person skilled in the art to make and use the invention as claimed and is provided in the context of the particular examples discussed below, variations of which will be readily apparent to those skilled in the art. Accordingly, the claims appended hereto are not intended to be limited by the disclosed embodiments, but are to be accorded their widest scope consistent with the principles and features disclosed herein.

Figure 1:
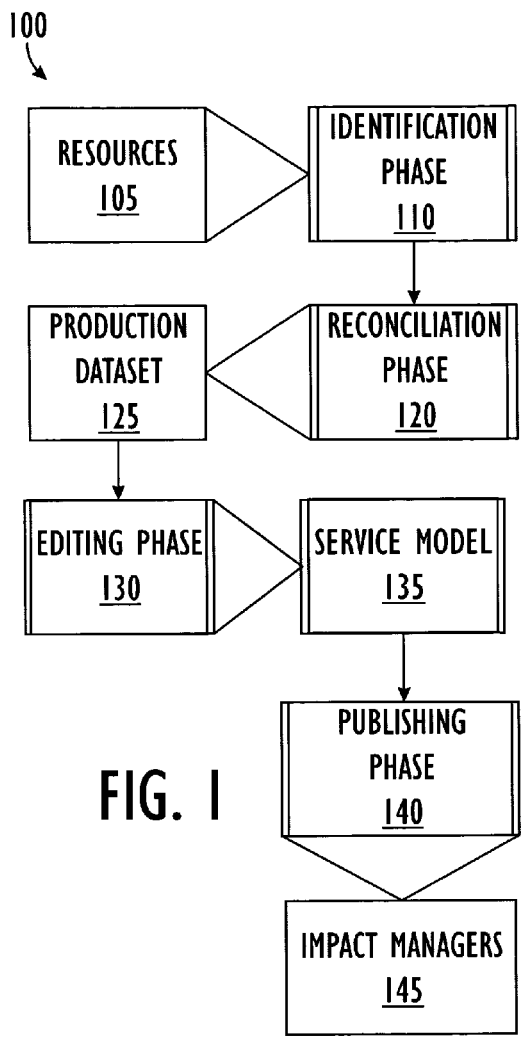
FIG. 1 illustrates a Business Service Management process according to certain teachings of the present disclosure.

Referring to FIG. 1, Business Service Management (BSM) process 100 in accordance with the present disclosure is directed to the acquisition, generation, propagation, and evaluation of a business services model for an enterprise computing system. The process 100 includes an identification phase 110, a reconciliation phase 120, an editing phase 130, and a publishing phase 140.

During the identification phase 110, resources 105 are detected through automated and/or manual discovery operations known in the art. As used herein, resources 105 include, but are not limited to, computer systems, computer system components, data storage systems, switches, routers, memory, software applications (e.g., accounting and database applications), operating systems, and business services (e.g., order entry or change management and tracking services). (In the present disclosure, the term "resources" may be interchangeably referred to as components.) It will be recognized that in a typical software embodiment, each detected resource 105 may be represented as an object (a software entity) that includes one or more attributes. For example, a computer system resource may be represented by a computer system object whose attributes include, among others, "Name," "IP Number" and "Operating System." Identification phase 110 also analyzes the detected resources 105 to determine if they were previously identified and reconciled or whether they are a newly detected resource.

During the reconciliation phase 120, data associated with resource objects (e.g., a resource objects' attributes and related values) identified as being different instances of a common resource are combined into a single or reconciled resource object. This reconciled resource object is pushed into (i.e., associated with) a reconciled dataset 125. (Unitary identified resource objects are also moved into reconciled dataset 125.)

In the editing phase 130, a Service Model 135 is created, updated, modified, or changed using the resources in the reconciled dataset 125. The Service Model 135 allows a user, such as an administrator, to model the components of the enterprise system and make changes to the system. Ultimately, the entire Service Model 135 or portions thereof are published to Impact Managers or cells of the network resources during the publishing phase 140. However, in another embodiment, creating the Service Model 135 can be automated so that no interaction is necessary from a user. In addition, creating the Service Model 135 can occur at resource discovery time, reconciliation time, or at another time.

Figure 2A:
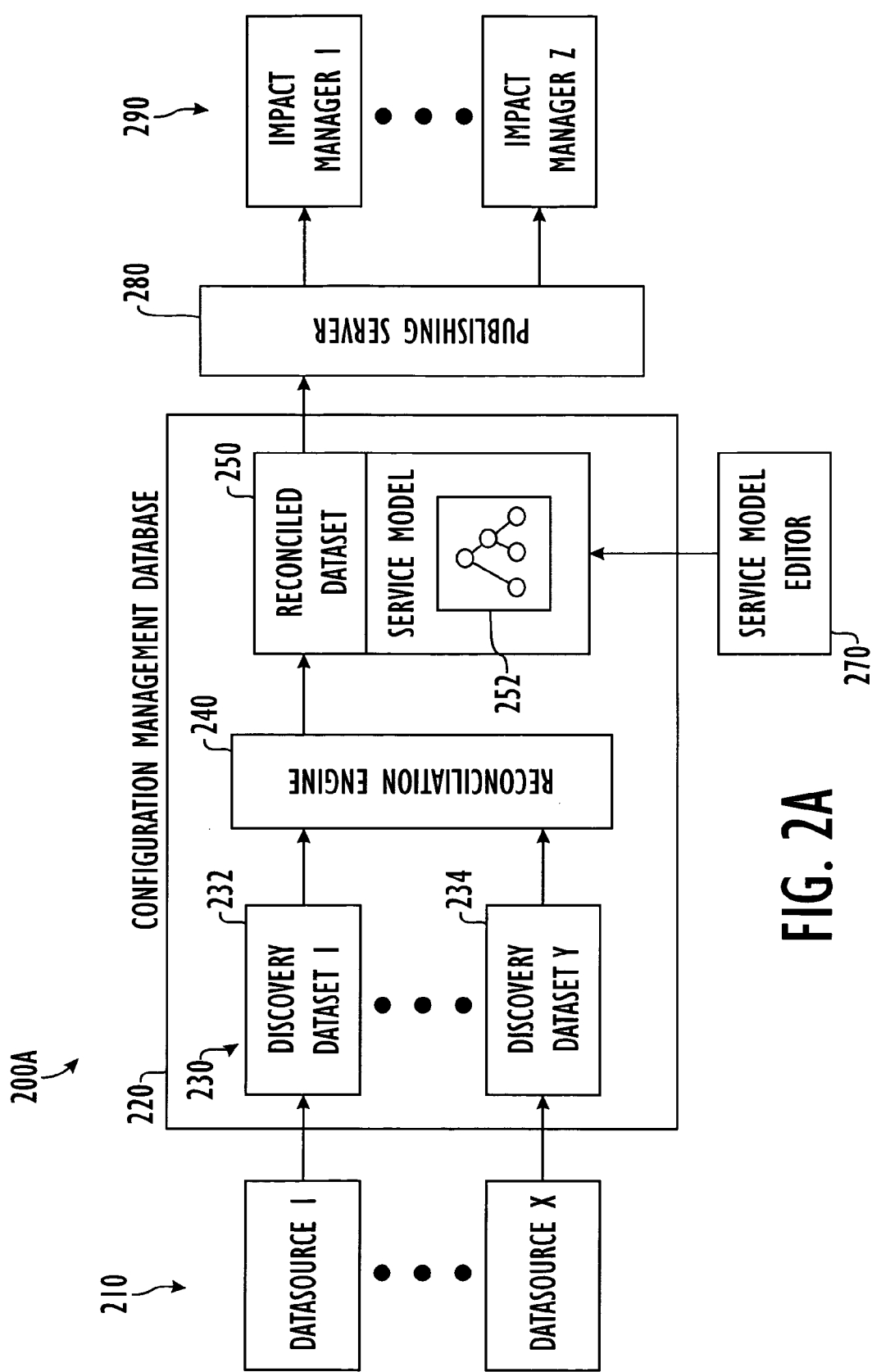
FIG. 2A illustrates an embodiment of a Business Service Management Architecture according to certain teachings of the present disclosure.

Referring to FIG. 2A, one embodiment of a Business Service Management architecture 200A is schematically illustrated. The BSM architecture 200A is directed to the acquisition, generation, propagation, and evaluation of a business service model. In the illustrated embodiment, a datastore or database (represented by Configuration Management Database, "CMDB") 220 is used to store component descriptions and relationships. The CMDB 220 includes the functional elements of discovery datastores 230, a reconciliation engine 240, and a reconciled dataset 250. The CMDB 220 can also include a published dataset (not shown). As explained in more detail below, the published dataset is used to store data that has been successfully published to Impact Managers 290 and can be used by the Publishing server 280.

The discovery datastores 230 include components and relationships identified during one or more discovery mechanisms (automated and/or manual) from one or more datasources 210. The Reconciliation Engine 240 provides a mechanism for taking data from multiple discovery sources (i.e., from the discovery datastores 232 and 234). In addition, the Reconciliation Engine 240 provides rules for identifying and merging data that is found in more than one source. Thus, the reconciled dataset 250 of the CMDB 220 holds a description of components and of the relationships among components. Details of the Common Management Database (CMDB) are disclosed in co-pending U.S. patent application Ser. No. 11/204,189, entitled "Resource Reconciliation," filed 15 Aug. 2005 and claiming benefit of provisional application Ser. No. 60/633,640, both of which are incorporated herein by reference.

In general, the reconciliation engine 240 accesses information describing the resources in the discovery datasets 230. Then, the reconciliation engine 240 determines whether any of the resources are described by information from at least two of the datasets 230. If so, the reconciliation engine 240 merges information from each of the datasets 230 that describe the same resource and generates reconciled information for the resource. Thus, operation of the Reconciliation Engine 240 results in a single, unified view of the data (the reconciled dataset 250). This unified data in the reconciled dataset 250 can then by used by the Impact Managers ("IM") 290 and other applications. As used herein, the Impact Managers 290 may also be referred to as cells.

Details related to impact management and software components of Impact Managers are disclosed in U.S. Patent Application Publication 2002/0138571 entitled "System and Methods of Enterprise Systems and Impact Management" and in U.S. Patent Application Publication 2004/0024571 entitled "System and Method for Assessing and Indicating the Health of Components," which are both incorporated herein by reference. In general, the Impact Managers 290 are software components distributed throughout an enterprise computing system. The Impact Managers 290 have event-processing engines that collect, process, and store events. The engines associate events with information pertaining to the components and other aspects of the enterprise computing system and determines their status. In turn, information from the Impact Managers 290 is used to access the impact of events on business services and other processes of the enterprise computing system.

The collection of components and their impact relationships form what is referred to as a Service Model "SM"). The Service Model 252 is stored in or with the reconciled dataset 250 of the CMDB 220. However, the real-time assessment of the impact that reported problems or events have on a specified Service Model 250 is not carried out by the CMDB 220. Rather, one or more Impact Managers 290 report such problems and events. To enable the Impact Managers 290 to assess impacts of various events, the Publishing Server 280 under coordination with the Service Model Editor 270 publishes or distributes information of the Service Model 252 to the Impact Managers 290. In turn, the Impact Managers 290 work on their own local copy of their portion of the Service Model 252. Accordingly, the BSM architecture 200A associates which Impact Mangers 290 manage which components and includes that association in the Service Model 252. Because the Service Model 252 or portions thereof are published or distributed to multiple Impact Managers 290, the Publishing Server 280 and other portions BSM architecture 200A, as described in more detail below, are responsible for controlling or managing how updates to the Service Model 252 in the CMDB 220 are passed along to the Impact Managers 290.

In one embodiment, the Service Model Editor 270 is a graphical client application that allows a user to visualize and manipulate the Service Model 252. The Service Model Editor 270 operates on a backend server or engine (not shown), which communcaites changes to the Service Model 252 in the CMDB 220. In general, the Service Model Editor 270 has various functions for visualizing the service model; searching the service model; creating and editing components; creating, editing, and deleting relationships between components; creating, editing, and deleting service model meta-data; and visualizing components related through non-impact relationships. The Service Model Editor 270 uses a graphical representation of the Service Model 252 so the user can see what components are related to other components, what components are associated with which Impact Managers 290, and what changes have been made since the last time an update was sent to the Impact Managers 290. New components or new impact relationships can be created through the Service Model Editor 270. In addition, the Service Model Editor 270 allows the user to update existing components (e.g., attributes) and/or relationships in the Service Model 252.

The Service Model Editor 270 centralizes the control and management of which portions of the Service Model 252 are associated with which Impact Manager 290 and when to send updates to the various Impact Managers 290. Being able to centrally control and manage the distribution of the Service Model 252 to the Impact Managers 290 with the Service Model Editor 270 can help ensure the integrity and consistency of the Service Model information at the Impact Managers 290. For example, an update of a component or relationship made in the CMDB 220 is not sent immediately to the Impact Manager 290 responsible for that component or relationship. The reason for this is that the update of the Service Model 252 does not necessarily correspond to a single component/relationship update, but rather a whole series of changes. Another reason is that the work of updating the Service Model 252 may be performed ahead of the time when the new Service Model 252 becomes active. Accordingly, the Service Model Editor 270 controls how the Service Model 252 is distributed to the Impact Managers 290 and initiates publishing of the Service Model 252 by the Publishing Server 280. In general, the Service Model Editor 270 can initiate publishing current changes, re-publishing Service Model data to a specific event-processing engine or Impact Manager, reviewing changes to be published, and verifying publish status.

To initiate publishing, the server of the Service Model Editor 270 communicates requests for publishing to the Publishing Server 280. The function of the Publishing Server 280 (under control of the Service Model Editor 270) is to publish or distribute to each Impact Manager 290 that portion of the Service Model 252 that the Impact Manager 290 is responsible for exercising—as updated in the CMDB 220. The Publishing Server 280 also maintains a copy of the "current" (i.e., previously published) Service Model 252 in the reconciled dataset 250 of the CMDB 220. When requested to publish updates of the Service Model 252 to one or more Impact Managers 290, the Publishing Server 280 selects those objects (component attributes, associated Impact Managers, events, relationships, etc.) from the reconciled dataset 250 that have been changed (i.e., added, deleted, modified, updated) since the last publish operation. The Publishing Server 280 then compares the changed objects with the copy of the service model kept in a production dataset of the CMDB 220. From the differences, the Publishing Server 280 produces a list of updates to be sent to the various Impact Managers 290. To avoid disrupting the Impact Managers 290 in their work while the Publishing Server 280 sends updates of the Service Model 252, the Impact Managers 290 have a companion process, called the Service Model Manager (not shown), that works with the Publishing Server 280 to propagate updates to the Service Model 252. The Service Model Managers receive updates sent by the Publishing Server 280 and validate that the updates can actually be applied to the particular Impact Managers 290.

After validating the updates, however, the Service Model Managers do not apply the updates immediately to the Impact Managers 290. Instead, the Publishing Server 280 controls when the Service Model Managers actually update the Impact Managers 290 so that application of the updates can be consistent. For example, it is possible that some of the updates cannot be applied to one particular Impact Manager 290. In such a situation, an inconsistent model would result if the Service Model Managers go forward and apply their updates to other Impact Managers 290. For this reason, the Publishing Server 280 instructs the Service Model Managers to apply the updates only if all the updates are deemed valid by the Service Model Managers to which they have been sent. Only then will the Publishing Server 280 command the Service Model Managers to make the Service Model 252 updates active. At that time, the Publishing Server 280 also updates the published copy of the Service Model 252 kept in the CMDB 220. When a Service Model Manager receives an activation command, it halts the processing of incoming alerts for its Impact Manager 290, uploads the updates to its portions of the Service Model 252, and then reactivates the processing of incoming alerts. In this manner, the time window of disruption to Impact Managers 290 can be kept to a minimum.

Based on the information of the Service Model 252 applied, event-processing engines within the Impact Managers 290 collect, process, and store events. Detected events are routed to the appropriate Impact Managers 290 where the events are correlated in the context of the Service Model at the Impact Manager 290 to determine their effect or impact on the modeled business service. Thus, the event-processing engines and Impact Managers 290 provide the core functionality for event and service impact management, and they are responsible for associating received events with the Service Model components and determining a component's status. Typically, the Impact Managers 290 and event-processing engines provide local event management as part of a larger distributed network that propagates events throughout the network. Accordingly, the Impact Managers 290 and event-processing engines are typically organized to model/process any model of a business service.

Figure 2B:
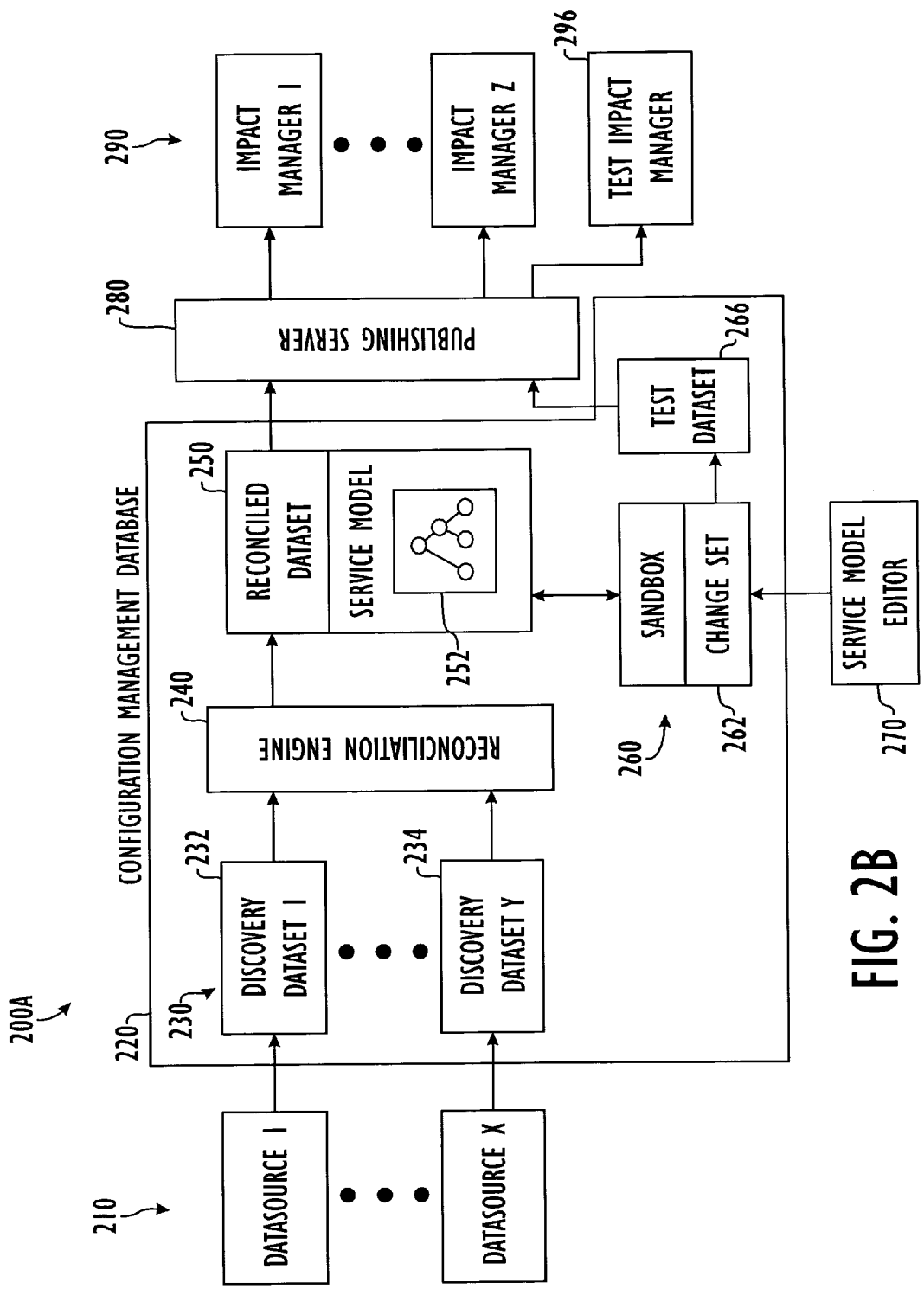
FIG. 2B illustrates another embodiment of a Business Service Management Architecture according to certain teachings of the present disclosure.

Referring to FIG. 2B, another embodiment of a Business Service Management architecture 200B in accordance with the invention is schematically illustrated. Many of the features of this architecture 200B are similar to those discussed above so that like reference numbers are used for like components. In the present embodiment, however, the CMDB 220 further includes a sandbox 260 and a test dataset 266. In this embodiment, updates to the Service Model 252 by the Service Model Editor 270 are not made directly to the copy of the service model 252 as with the previous embodiment. Rather, the Service Model Editor 270 makes changes to a change dataset 262 in the sandbox 260.

The change dataset 262 includes all of the updates and changes made by the Service Model Editor 270 to the Service Model 252. The changes and updates in the change set 262 are then stored in a test dataset 266 in the CMDB 220. A user can then publish the test dataset 266 with the Publishing Server 280 to a Test Impact Manager 296. This test process has several advantages. For example, the Service Model 252 may be complex, and the test process allows the user to test any updates or changes without actually committing or implementing those changes.

In the present embodiment, publishing of the Service Model from the reconciled dataset 250 is not strictly a user activity that is invoked from the Service Model Editor 270. Rather, the present embodiment can use an automated process invoked after the reconciliation process. As new data gets reconciled into the reconciled dataset 250, for example, the publishing server 280 is made aware of this new or changed data and determines if a publishing activity is necessary. If so, the publishing server 280 automatically initiates the publishing activity.

For example, the reconciliation engine 240 maintains a log of edits that it makes to the reconciled dataset 250. This log is monitored, and Publishing server 280 determines from the edits whether they should be automatically published or not. This automatic publication process may be suitable for a variety of situations. In one example, the Publishing server 280 can perform an automated publishing operation when the reconciliation engine 240 edits information on a component that has already been previously published by the Publishing server 280. In another example, the Publishing server 280 can perform an automated publishing operation when information in the reconciled dataset 250 has been obtained through topology discovery techniques known in the art that are able to determine impact relationships. In such a situation, the discovered information does not necessarily require user intervention and can be published automatically by the Publishing server 280.

In yet another example, the Publishing server 280 can perform an automated publishing operation for changes related to virtualization. As is known in the art, virtualization in one example involves moving the hosting of an application from one host to another based on policies, host availability, etc. When such a change occurs, a virtualization system responsible for managing virtualization in the enterprise computing system can notify the CMDB 220 of the change. In turn, the Publishing server 280 can automatically publish the updates to Impact Managers 290 without the need for user intervention. Accordingly, the automated publishing process of the Architecture 200B can be used for these and other examples.

With an understanding of the Business Service Management process and architecture discussed previously, the discussion now turns to details of the Service Model Editor 270. As alluded to above, the Service Model Editor 270 allows a user to edit (e.g., create, update, modify, and change) a Service Model 252 and to initiate publication of the Service Model 252 to the Impact Managers 290. In particular, the Service Model Editor 270 is used to perform centralized editing of the Service Model 252 stored in the CMDB 220. In addition, the Service Model Editor 270 is used to configure and initiate the process performed by the Publishing Server 280, which centralizes the publishing of the Service Model 252 from the CMDB 220 to distributed Impact Managers 290.

Figure 3:
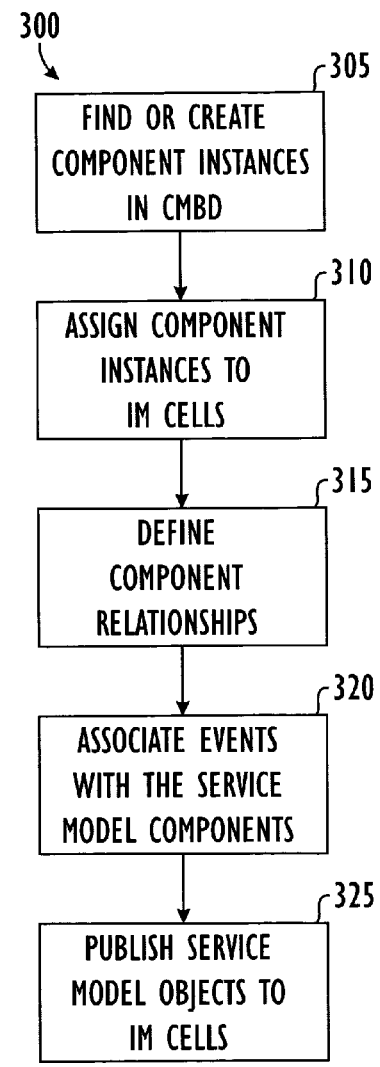
FIG. 3 illustrates a process for building a Service Model with a Service Model Editor.

A process 300 for editing a service model with the Service Model Editor is shown in FIG. 3. (To facilitate the discussion, references are concurrently made to element numbers of FIGS. 2A and 2B.) Initially, a user, such as a network administrator, creates or finds components in the CMDB 220 (Block 305). Creating components involves selecting components from templates and/or manually defining component attributes, such as name, alias, network address, associated Impact Manager or cell, component type, etc. Finding components involves searching for one or more components in the pool of components stored in the reconciled dataset 250 of the CMDB 220. In the Service Model Editor 270, the components in the Service Model 252 are assigned to the Impact Managers or cells 290 (Block 310), and the user defines relationships between the components (Block 315). Next, the user associates certain events with the components in the Service Model 252 (Block 320). These events constitute what events the Impact Managers 290 will monitor and manage as part of their functionality. Finally, the user publishes the objects (i.e., component attributes, events, relationships, etc.) of the Service Model 252 to the Impact Managers 290 (Block 325).

Figure 4:
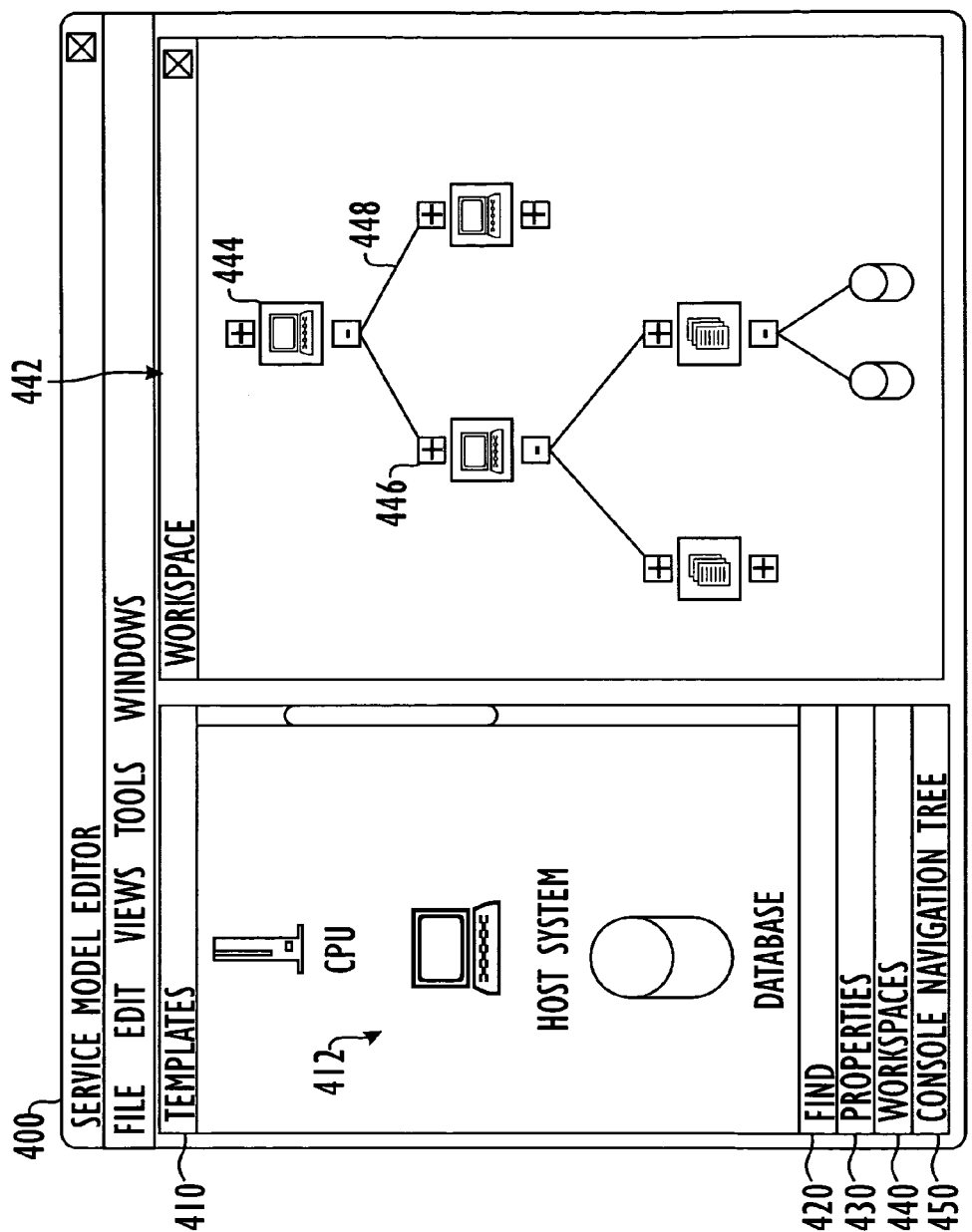
FIG. 4 illustrates a screen of the Service Model Editor.

As noted previously, the Service Model Editor 270 is a graphical user interface (GUI) application that allows the user to create and initiate publishing of a Service Model 252. In the discussion that follows, exemplary user interface screens of the Service Model Editor 270 of the present disclosure are discussed. In FIG. 4, for example, a main screen 400 of the GUI of the Service Model Editor is illustrated. Within the screen 400, the user has access to dockable windows that include templates 410, find 420, properties 430, workspaces 440, and console navigation tree 450.

Viewing a Service Model is one primary task used to create and modify the Service Model. To help the user visualize, create, and modify the Service Model, the Service Model Editor schematically displays components and relationships of the Service Model in one or more workspace windows 440. In a first type of workspace window 440, components are shown as they are related by their impact relationships. In another type of workspace window 440, components are shown in non-impact relationships in what is referred to as a Topology workspace. Various discovery sources are capable of determining relationships of many types other than impact relationships, and these non-impact type relationships provide additional information about how various components are related. In addition, another type of workspace window 440 allows the user to produce a graphical layout based on network topology, application topology, or other customizable typology.

One example of a workspace window 442 is shown open in the screen 400 of FIG. 4. This workspace window 442 shows impact relationships between components. Preferably, only a portion of the Service Model is shown in the window 442 based on a starting point that selected by the user because a typical Service Model can have thousands of components and relationships. As shown, the Service Model is displayed as a hierarchy of nodes and links. The nodes are components 444 that are displayed as icons in the hierarchy. The links are relationships 448 between components 444 and are shown as lines interconnecting the icons. Expandable/collapsible handles 446 allow the user to expand or collapse the subgraph of parent and child components 444 related to one another in the hierarchy.

The relationships 448 represent interdependencies between components and map the flow of events between components in the Service Model. In general, a component can consume the services of another component in a consumer relationship, can provide services to another component in a provider relationship, or can do both. Active impact relationships 448 are rendered as a solid line linking two components 444, inactive impact relationships (not shown) may be rendered as a gray line linking two components 444, and non-impact relationships (not shown) may be rendered as a dashed line linking two components. The relationships 448 are selectable so that user can show and edit properties of the selected relationship in a properties window 430.

The templates window 410 allows the user to select a template component 412 and drag it into an open workspace window 440. When a template component 412 is inserted into a workspace window 440, an instance of the added component is automatically stored in the reconciled dataset (250; FIGS. 2A-2B) of the CMDB 220. A number of template components 412 are preferably preconfigured in the templates window 410 for selection by the user. Some examples of template components 440 in hierarchical order include generic groups (e.g., Business Processes, Geographical locations, Cities, Regions, Sites, etc.); Logical Components (e.g., Aggregate SLA Measurement, Application Connectivity, Network Connectivity, Database Replication, Service Level Agreement (SLA) Configuration, etc.); Systems (e.g., Applications, Application Infrastructure, Software Servers, Hardware Clusters, Software Clusters, Mainframes, Network Printers, Virtual Systems, etc.); System Components (e.g., Hardware System Components, Media, Disk Partition, File System, Database Storage, Local File System, Remote File System, System Resource, etc.); and System Services (e.g., application services, etc.).

The template components 440 can also be groupings of components. For example, a template component 440 can represent a full, distributed set of applications, such as J2EE or SAP applications. In addition, the template components 440 can remain templates even after being added to the Service Model when dragged onto the workspace. Keeping the components as templates or virtual instances of components in the Service Model allows the user to abstract all or part of a Service Model without relating those components to actual components stored in the reconciled dataset. The user enters qualifiers of the template component 440. These qualifiers describe qualities of the component without giving specifics of an actual component. For example, a user can qualify a component as an "Apache Server operating on a Windows®-based system and having a name qualifier." At the time of publishing the Service Model, the qualifiers specify how the BSM architecture is to select (or later bind) real instances of detected, reconciled component information to these template components 440.

Find windows 420 allow the user to search for components in the reconciled dataset (250; FIGS. 2A-2B) of the CMDB. Details related to the find windows 420 are provided below with reference to FIGS. 7 through 9. The console navigation tree window 450 has a navigation tree and allows the user to organize and manage nodes in the Service Model into groups and folders.

The Properties window 430 allows the user to select a component in a workspace window 440 and to define various properties and values for the component. Typical properties to define a component include creator, creation date, editor, last edit date, object type, name, description, owner, associated cell or Impact Managers, whether component is in the Service Model, permissions, priority, cost, alias name, and others known in the art. Typical properties to define a relationship include some of those associated with components and include whether the relationship is active, what the relationship type is (i.e., direct, indirect, etc.), and others known in the art.

As noted previously, the user can create a component by adding a template component 412 to a workspace. In another option, the user can manually create a component using a menu operation, for example. In FIG. 5, an example of a screen 500 of the Service Model Editor for manually creating a component is illustrated. The screen 500 has tabs to input information that include a general tab 510, a status and alias tab 512, a permissions tab 514, and a priority and cost tab 516. The general tab 510 allows the user to select the type of component from a hierarchical tree 520 of components and allows the user to define the component name, description, and owner in data fields 530. In addition, the general tab 510 allows the user to associate the created component with an Impact Managers or cell using a drop down box 540, which is pre-populated with cells of the BSM architecture configured in the system. Furthermore, the user specifies whether the component is not in the model or in the model using selections 550. If the created component is defined as "not in the model," the created component is added to the reconciled dataset of the CMBD 220 but is not added to the service model 252.

In the tabs 512, 514, and 516, the user enters information that is commonly used to define components in the BSM architecture. In the status and alias tab 512, for example, the user selects a status computation model and enters values for component attributes, and other values commonly used in the art. The status computation model defines how the status of components and relationships are determined and propagated. In addition, the status and alias tab 512 allows the user to define a unique alias name to each component, which is required for publishing.

In the permissions tab 514, the user sets the access permissions for the components. Preferably, the user can select from a list of roles and associate the selected role with a component to define access and read/write capabilities. In the priority and cost tab 516, the user assigns priorities and costs to components. Preferably, the user can select a cost from a list of available costs and can add new costs if desired. In the other tab 518, the user can edit all other non-system properties and attributes for the component types.

In addition to creating components, users can create relationships between components with the Service Model Editor. Relationships tie a consuming component to a provider component in the Service Model. The type of relationship between components is one of the primary factors in determining how status changes are propagated through the Service Model. One type of relationship the user can create is the impact type. Once a relationship is created, the user can assign attributes to the relationship.

Figure 6:
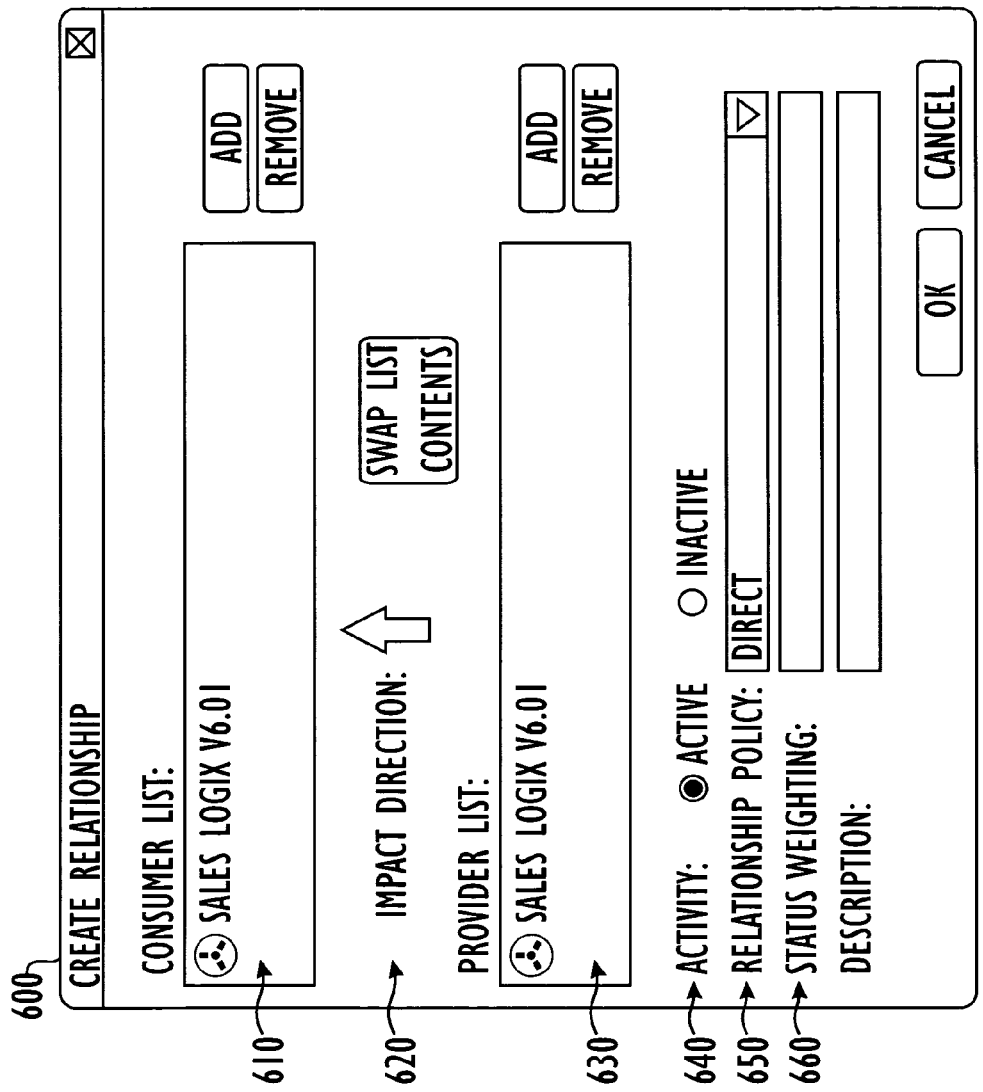
FIG. 6 illustrates a screen of the Service Model Editor for creating a relationship between components.

In FIG. 6, an example of a screen 600 of the Service Model Editor for creating a relationship between components is illustrated. The screen 600 has a consumer list 610 for adding component(s) as the consumer(s) in a relationship, an impact direction 620 for the relationship, and a provider list 630 for adding component(s) as the provider(s) in the relationship. Selecting to "add" components to the lists 610 and 630 allows the user to access components in the Service Model stored in the reconciled dataset (250; FIGS. 2A-2B) of the CMDB. After selecting the impact relationship between components, the user defines whether the relationship is active or inactive (selections 640); defines the relationship policy (drop down 650); and defines the status weighting (field 660) for the relationship. The policy and status weighting governs how status and other impact related information is handled and propagated through the relationship of components.

Although the user can create components and can select template components to build a Service Model, another feature of the Service Model Editor of the present disclosure allows the user to search for components based on search criteria. As noted previously, the reconciled dataset (250; FIGS. 2A-2B) of the CMDB is populated with components that are discovered using discovery tools and that are manually entered. Therefore, the stored components exist in a large pool of objects, any of which can be attached to various locations of a Service Model. The find windows (440; FIG. 4) of the Service Model Editor allow the user to search for components stored in the large pool of objects in the reconciled dataset of the CMDB.

Figure 7:
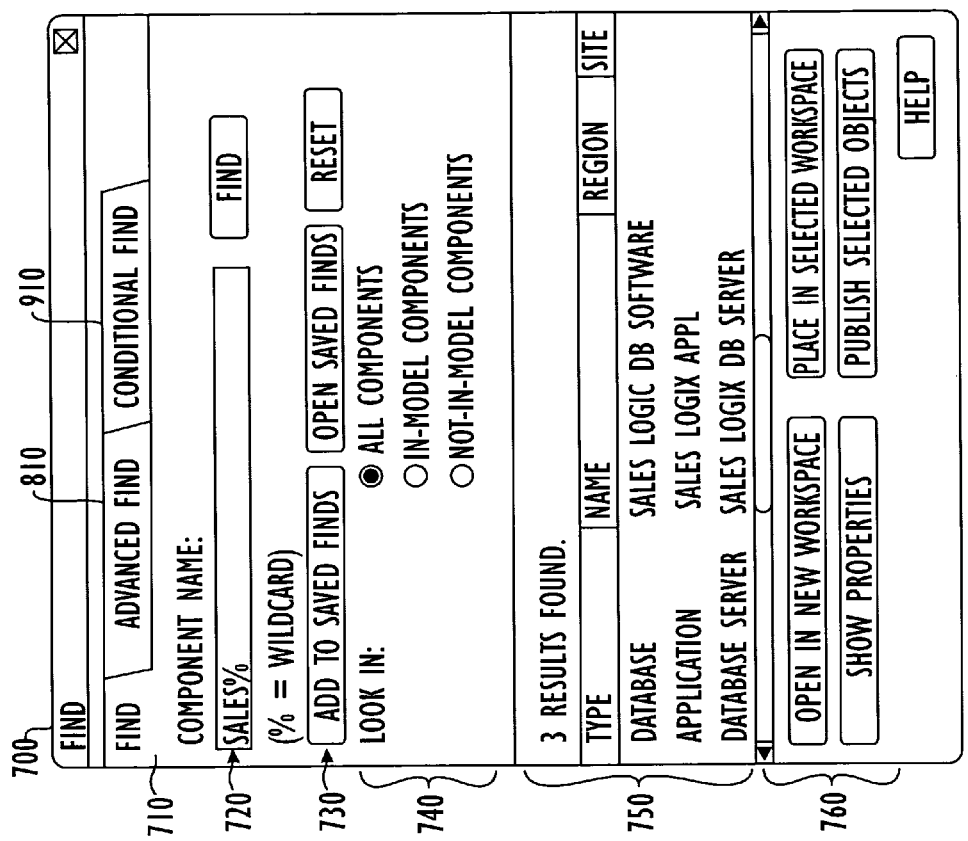
FIG. 7 illustrates a screen of the Service Model Editor for finding a component in the reconciled dataset of a Configuration Management Database (CMDB).

In FIG. 7, a first example of a find screen 700 of the Service Model Editor for searching for a component in the reconciled dataset of the CMDB is illustrated. This find screen 700 shows general find features of the Service Model Editor, as indicated by the "find" tab 710. Other find features of the Service Model Editor are indicated by an "Advanced Find" tab 712, and a "Conditional Find" tab 714, which are each discussed later. In the current find tab 710, the user can search by a component name by entering a name or portions thereof in a field 720. Preferably, the search algorithm supports wildcard characters when searching for a name.

To refine the find capabilities, the components that have been previously found are saved and stored and these stored finds can be opened using controls 730. These controls 730 can be used to refine searches. In addition, the find capabilities can be limited to particular criteria related to the components and model. Using selections 740, for example, the user can search all components in the pool of the reconciled dataset, can search only in-model components, and can search only not-in-model components.

Results of the find are shown in a list 750 that displays the type, name, and other attributes of the find operation. Preferably, the user can sort the results in the list by selecting one of the displayed attributes. From the list 750, the user can select one or more of the found components and then perform one of the available operations 760. These operations 760 include opening the selected component(s) in a new workspace, placing the selected component(s) in a selected workspace, showing editable properties of the selected component(s) in a properties window, and publishing information of the selected component(s) directly to an associated impact manager. By selecting to publish information directly, the user can make individual changes, updates, or modifications to portions of the service model that are substantially localized. This individualized process of publishing is contrasted with the more extensive form of publishing updates of a Service Model to a number of distributed Impact Managers where features discussed later are preferably used.

Figure 8:
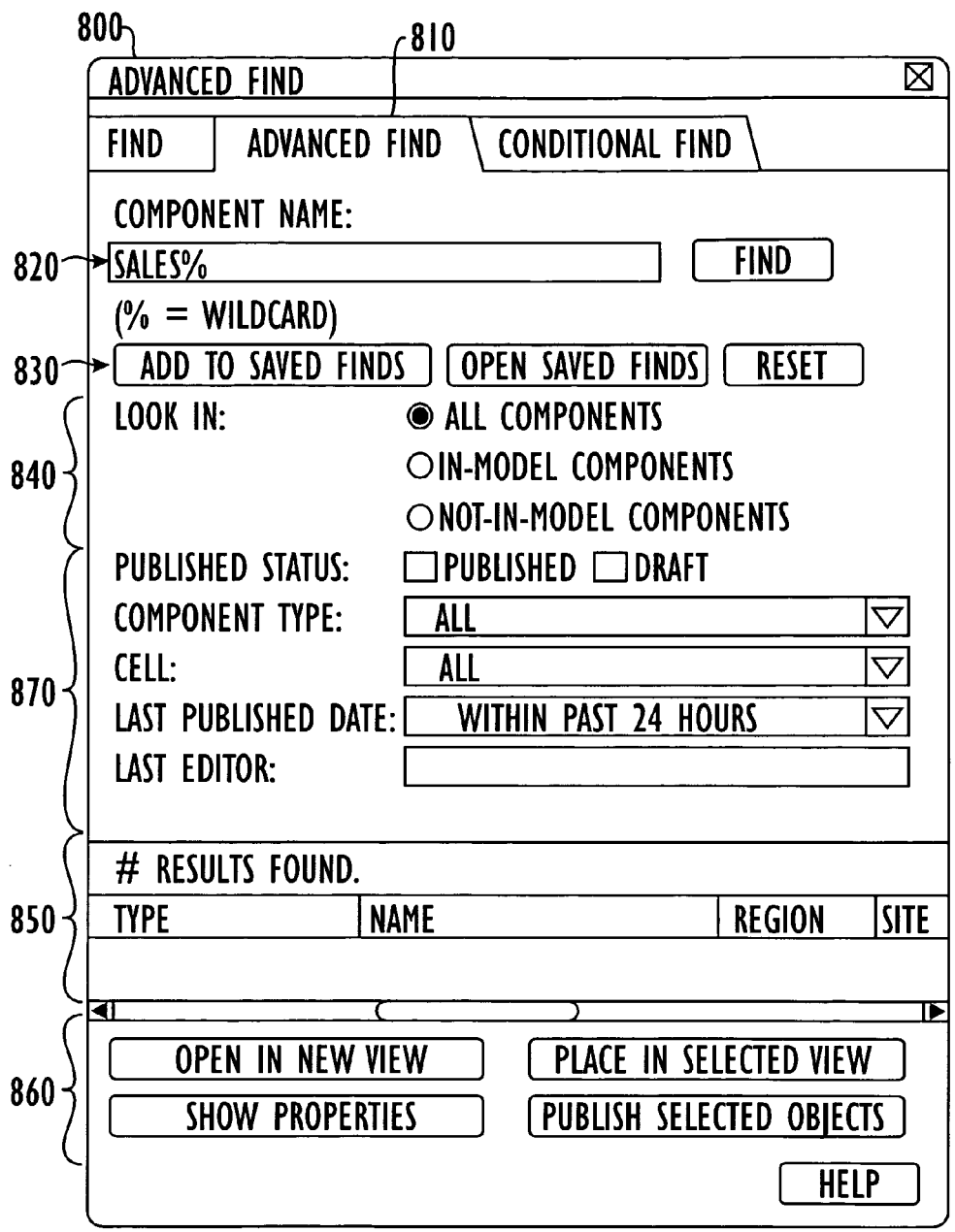
FIG. 8 illustrates a screen of the Service Model Editor for finding a component with advanced criteria.

In FIG. 8, an example of an advanced find screen 800 of the Service Model Editor is illustrated. Many of the capabilities in the advanced find tab 810 of screen 800 are the same as the general find capabilities discussed previously. However, the advanced find tab 810 includes advanced capabilities. For example, the advanced find tab 810 allows the user to define, in fields 870, whether the component being searched for has been published or not, what type of component it is, what Impact Manager or cell it is associated with, what the last published date is, and/or who the last editor (i.e., user) of the component is. By limiting the find operation to searching components of a specific publish status, the user can search published components only, search components that have not been published, or search components that have previously been published but have since been edited and not yet republished. In addition, the other advanced capabilities for searching offered by the advanced find screen 800 further enhance the ability of the user to search for and locate particular components in the large pool of components stored in the reconciled dataset (250; FIGS. 2A-2B) of the CMDB.

Figure 9:
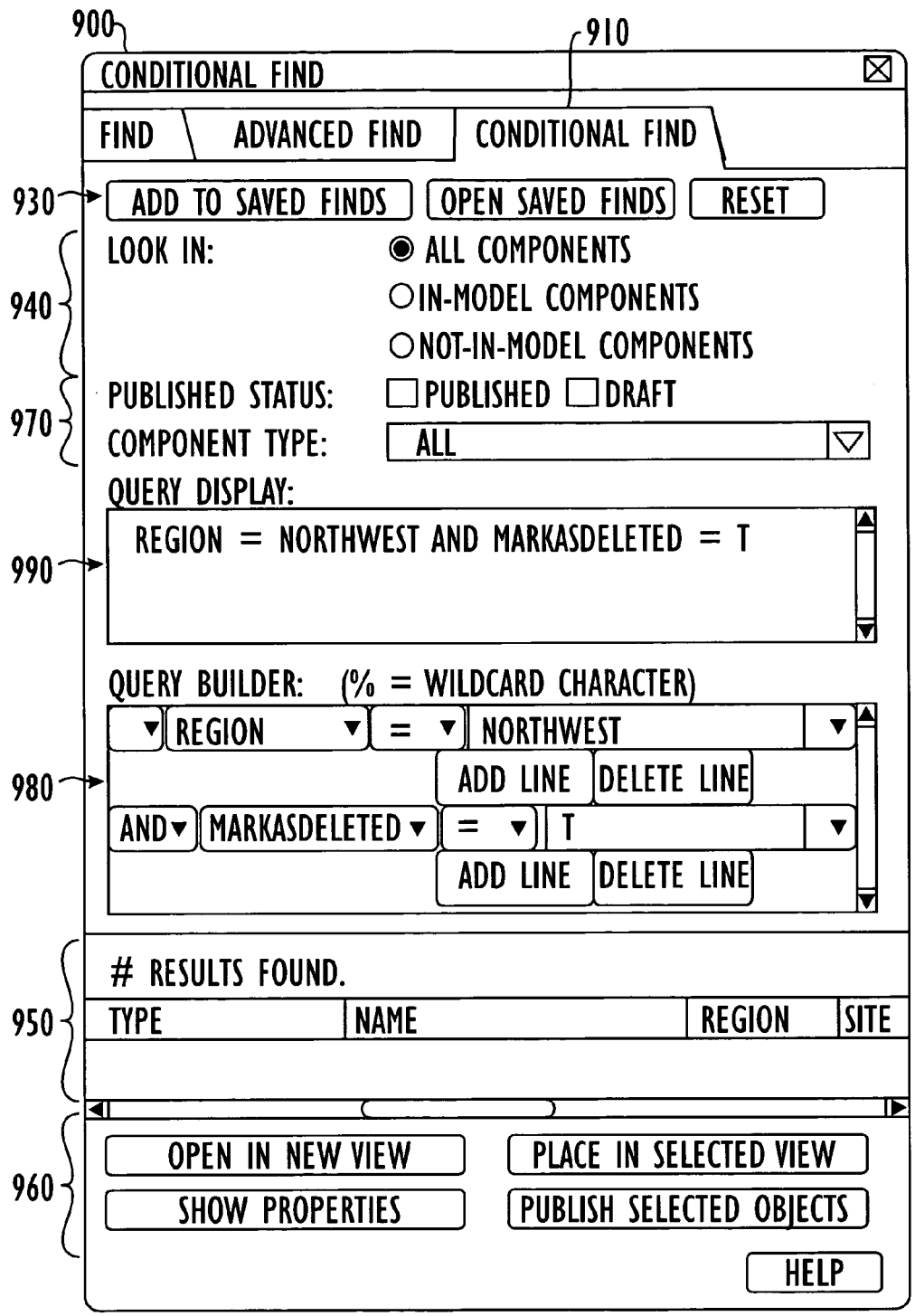
FIG. 9 illustrates a screen of the Service Model Editor for finding a component with conditional criteria.

To enhance the ability of the user to find components, an example of a conditional find screen 900 of the Service Model Editor is illustrated in FIG. 9. Many of the capabilities in the conditional find tab 910 of screen 900 are the same as the other find capabilities discussed previously. However, the conditional find tab 910 allows the user to create a search query in field 980 for finding components. The search query fields 980 allows the user to build a query that contains Boolean and/or logical relationships of components attributes as they relate to attribute values. The constructed query is shown in a query display field 990. The search query fields 980 preferably have pre-populated drop downs for the user to select attributes, relationships, relationship operators, Boolean operators, logical relationships, and other information for constructing the query. Having the fields 980 pre-populated allows the user to construct the query without needing to know specific code, names, etc. required for searching. Preferably, component attributes provided in the drop downs are determined by the component type selected. Fields for entering values are also provided so that the user can create a condition clause relating an attribute to a manually entered search value.

Figure 10:
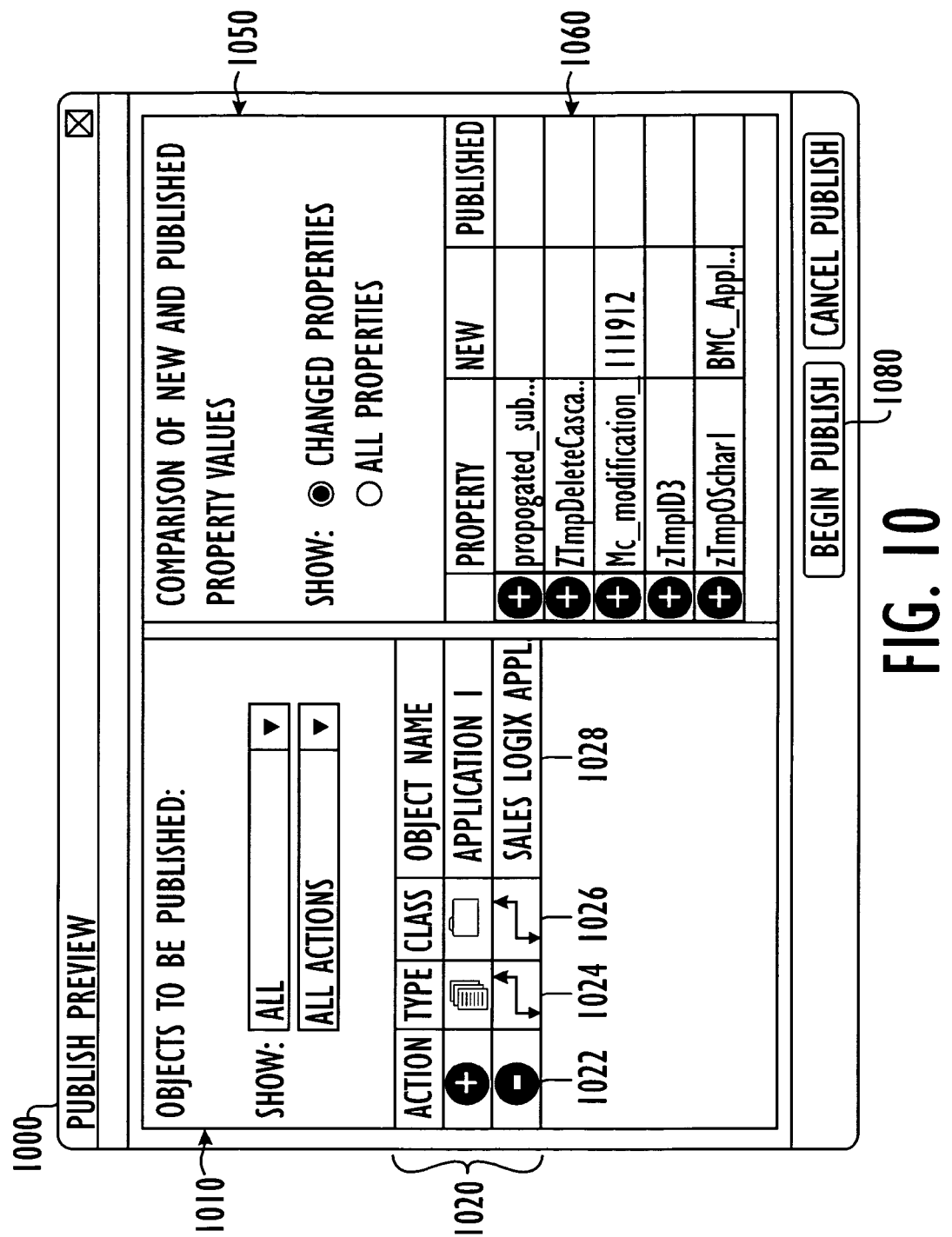
FIG. 10 illustrates a screen of the Service Model Editor for previewing publishing information.

Once the user has built the Service Model using the various screens discussed above, the Service Model Editor allows the user to preview the Service Model that is to be published or distributed to the Impact Managers. Referring to FIG. 10, a screen 1000 of the Service Model Editor for previewing publishing information is shown. In the screen 1000, the user can select which objects (i.e., Service Model attributes of components) to view using fields 1010. For example, the user can select all or particular sets of objects and actions to be viewed. The selection only changes what is viewed in this screen 1000 and does not change what will or will not be published. A table 1020 of objects to be published is provided based on the selected view. The table 1020 shows the action (i.e., add, delete, or modify), the type of object (e.g., component or relationship), the class of the object, and the name for the object to be published.

In addition, the screen 1000 includes fields 1050 for comparing the new and previously published property values for a component that has been selected in table 1020. For example, the user can select to view only changed properties or all properties in comparison to their previously published values for a selected component in table 1020. The comparison is shown in a table 1060 showing the action, property name, new value, and previously published value. After reviewing the information, the user can initiate the publish operation by selecting button 1080.

Then, the publish operation initiated with screen 1000 publishes or distributes all objects set for publishing to the associated Impact Managers. In another option discussed previously, the user can publish only selected objects from the Find, Advanced Find, Conditional Find windows of FIGS. 7 through 9. For example, the user selects one or more objects in the lists of found objects and clicks "Publish Selected Objects" button in these windows. In another option, the user can publish only selected objects from a workspace window, such as shown in FIG. 4, which contains the object(s) to publish. In the workspace window, for example, the user selects the object(s) to publish and uses a "Partial Publish" command on the toolbar, a "Publish Selected Objects" command on the menu bar, or other menu operation.

Figure 11:
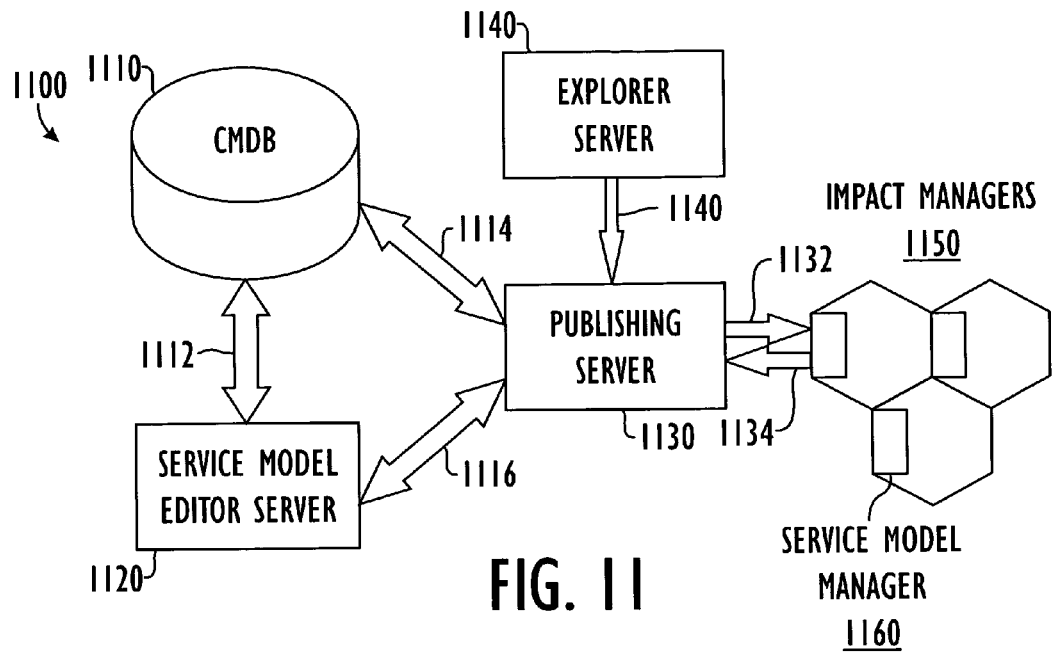
FIG. 11 illustrates portion of a BSM architecture having a publishing server.

As discussed previously with reference to FIGS. 2A-2B, a Publishing Server 280 publishes or distributes a Service Model or portion thereof to Impact Managers 290. Referring to FIG. 11, portion of the BSM architecture 1100 is shown in detail. In particular, the CMDB 1110, the Service Model Editor Server 1120, a publishing server 1130, an explorer 1140, Impact Managers 1150, and Service Model Managers 1160 of the BSM architecture 1100 are illustrated. The CMDB 1110 and the Service Model Editor Server 1120 are the same as discussed previously and operate together using communications 1112 detailed above. The CMDB 1110 and Publishing Server 1130 communicate queries and commands 1114 related to the Service Model between each other. The Service Model Editor Server 1120 and the Publishing Server 1130 communicate publishing commands and log retrievals 1116 between each other. The Publishing Server 1130 retrieves information pertaining to the Impact Managers and Impact Managers 1150 from the explorer server 1140. The information retrieved includes host/IPs, ports, and encryption keys for the Impact Managers 1150 that the Publishing Server 1130 needs to communicate with the Impact Managers 1150.

As noted previously, the Service Model Editor on Server 1120 is used to configure and initiate a publishing process. Requests for publishing are communicated to the Publishing Server 1130 via the Service Model Editor Server 1120. In turn, the Publishing Server 1130 is responsible for centralized publishing of a Service Model from the CMDB 1110 to distributed Impact Managers 1150. Publishing includes publishing of the entire Service Model or portion thereof and publishing updates, changes, or modifications. Publishing can be based on a schedule, can allow for partial selection among components for publishing, and can allow for publishing class modifications, which can be installed in the knowledge base (not shown) for the Impact Managers 1150.

The Publishing Server 1130 publishes the Service Model or portions thereof as distribution packets 1132 to the Impact Managers 1150. The distribution packages 1132 contain either a complete Service Model to replace the existing one or contain a set of modifications to update an existing Service Model. Each Impact Manager 1150 has to verify the portion of the published Service Model it receives when applying the packages 1132. To do this, every Impact Manager 1150 that is publish-enabled has a Service Model Manager 1152, and every Impact Manager 1150 only accepts modifications to its portion of the Service Model from that Service Model Manager 1152.

The Service Model Managers 1152 at the Impact Managers 1150 manage and coordinate the publishing of the Service Model with the Publishing Server 1160. Whenever the Publishing Server 1130 contacts an Impact Manager 1150 to publish Service Model information, the Impact Manager 1150 activates its Service Model Manager 1152. The Publishing Server 1130 then sends a Service Model package 1132 to the Service Model Manager 1152. The Service Model Manager 1152 verifies the package 1132 against the current Service Model from the associated Impact Manager 1150. Then, the Service Model Manager 1152 sends a verification result 1134 to the Publishing Server 1130.

If all Service Model Managers 1152 at the Impact Managers 1150 accept and verify the distribution packages 1132, the Service Model can be applied effectively. Between the beginning of the verification phase and the end of the application phase, the active Service Model at the Impact Managers 1150 is preferably not modified to ensure that results of the verification remains valid. After the distribution packages 1132 have been either verified or not, the Publishing Server 1130 instructs all connected Service Model Managers 1152 whether to apply its package or not. If the instruction is positive, the Service Model Managers 1152 present the Service Model packages to their associated Impact Managers 1150 and terminate. In turn, the Impact Managers 1150 adapt their portions of the Service Model. If the instruction is negative, the Service Model Managers 1152 terminate operation without implementing the information of the Service Model. In this way, the Service Model Managers 1152 can ensure that only one publishing process is performed at one time.

Further details related to the communication and coordination between the Publishing Server 1130 and Service Model Managers 1152 are provided below. As alluded to above, the communication and coordination between the Publishing Server 1130 and Service Model Managers 1152 preferably ensures the integrity and consistent application of Service Model information provided to the Impact Managers 1150.

When communicating, the Publishing Server 1130 connects to an Impact Manager 1150 using a command line interpreter and initiates the publishing process with a command. Impact Managers 1150 are configured to accept any Service Model publish ("smpublish") command, even if the Impact Managers' Service Model Manager 1152 is already active. The Impact Managers 1150 do not activate another instance of their Service Model Managers 1152. The port number for communicating with the Publishing Server 1130 is retrieved from a specific file (not shown) that is created by the Service Model Managers 1152. Before activating the Service Model Managers 1152, the port files are checked. If the port files have been recently updated, the Service Model Managers 1152 are considered active. Otherwise, the Service Model Managers 1152 are (re)started.

As soon as the Service Model Managers 1152 have a listening port number, the number is stored in a specified file (not shown). This file is regularly updated to indicate activity. The Service Model Managers 1152 then wait for commands from the Publishing Server 1130. Before actual publishing, a check is made against each Impact Manager 1150. In this check, a connection to each Impact Manager 1150 is established by sending a "ping" to each Impact Manager 1150 before initiating publishing, for example. If one of the Impact Manager 1150 associated with the publishing is not available, publishing may be aborted so that publishing the Service Model will be consistent.

At any time, the Service Model Managers 1152 are in either a standby session or a publish session. There can only be one such session at a time. All session information is stored on disk to enable a resume of the session after a restart of the Service Model Managers 1152. During a session, the Service Model can be modified and verified at any moment. The session is closed with the effective application of the new Service Model or with an abort of the session. If an abort occurs, the existing Service Model is left unchanged.

To communicate errors to the Publishing Server, all commands from the Publishing Server 1130 are of a QUERY type, and they return an exit code followed by command specific answer data. The codes can indicate success, invalid session, session already open, invalid component identifier, component identifier already in use, duplicate component, invalid slot settings, verification failed, and publish failed. For any code other than success, the publishing process can be terminated altogether to prevent partial publishing of the Service Model or portion thereof. As will be appreciated, implementing only some of the changes and updates of a Service Model is not desirable.

To ensure consistent application of Service Model information, each Impact Manager 1150 can be in one of the three states. In a first state, publishing is successfully applied to the Impact Manager 1150. In a second state, publishing is not successfully applied to the Impact Manager 1150. For example, the Publishing Server 1130 does not know whether the Service Model has been applied or whether Impact Manager 1150 is in an inconsistent state. Typically, this situation occurs when the Publishing Server 1130 loses its connection (for any reason) to the Impact Managers 1150 during publishing. In a third state, publishing has not been initiated.

Publishing has failed as soon as one of the Impact Manager 1150 is not in the first state of successful publishing. A publish log maintained by the Publishing Server 1130 contains details of a publication, such as its success or failure and the status for every Impact Manager 1150.

In one embodiment, the Publishing Server 1130 allows incomplete publishing of Service Model information and republishing of information that was not successfully published. For example, Service Model information at the Impact Managers 1150 that was successfully published is stored in a published copy of the Service Model. A new publish request can then include modifications for Service Model information that was not successfully published during a failure of a previous request. Republishing an entire model to certain Impact Managers 1150 may be necessary if the data of the Impact Managers 1150 is no longer synchronized with data of the BSM architecture.

In another embodiment of the publishing process, Impact Managers 1150 ensure that the Service Model is either entirely published or is not published to any Impact Manager 1150 at all. If an Impact Manager 1150 cannot support publishing, then every Impact Manager 1150 is given a no-publishing state, and the Publishing Server 1130 does not update the published copy of the Service Model in the CMDB 1110. A new publishing operation must then be initiated by a user at the Service Model Editor Server 1120 or by an software engine that schedules publishing operations.

Figure 12:
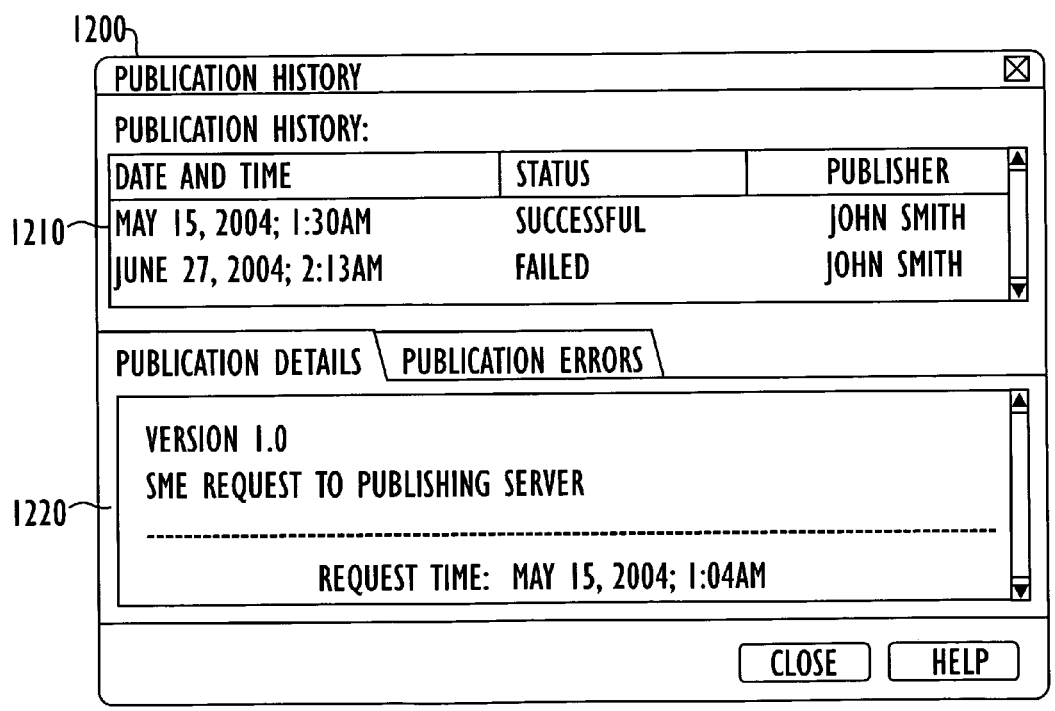
FIG. 12 illustrates a screen of the Service Model Editor for reviewing publication history.

After successful publishing, the Publishing Server 1130 updates the CMDB 1110 to store a copy of the successfully published Service Model. The Publishing Server 1130 also puts a timestamp on this copy of the Service Model. Preferably, this time is the time of the CMDB 1110 at which retrieval of last modifications has occurred. When setting the publish timestamp, the CMDB 1110 does not update the last modified timestamp. The Publishing Server 1130 also maintains a log of publishing, and the Service Model Editor Server 1120 can request publish log files from the Publishing Server 1130. During the publishing process, the user is presented with a graphical dialog at the Service Model Editor Server 1120 indicating that publishing is in progress. When successfully completed or failed, a review screen is presented in the Service Model Editor at the Server 1120. An example of such a screen 1200 is shown in FIG. 12. In this screen 1200, the user can view the details and errors of recent publication operations. For example, a publication history 1210 of recent prior publishes is shown, and details and error information for a selected publication in the history 1210 is displayed in field 1220.

What is claimed is:

1. A computer server comprising at least one element of hardware, the computer server programmed with instructions for causing the computer server to perform a computer network service modeling method, the method comprising:
    receiving at least one user-entered search criterion in a service model editor to locate information about one or more resources of a computer network service, wherein the service model editor comprises a graphical user interface (GUI);
    searching information in a database based on the at least one user-entered search criterion to create a service model for managing the computer network service, the information in the database describing resources of the computer network service;
    creating at least a portion of a service model of the computer network service in the service model editor using information obtained through searching;
    enabling manipulation of at least the portion of the service model in the service model editor;
    enabling user selection of different publishing options using the service model editor including an option to publish only selected objects of the service model;
    providing a publishing preview interface using the service model editor including options to view objects to be published including object attributes and values for a selected object;
    initiating publishing of at least a portion of the service model to one or more impact managers of the computer network service responsive to the user selection of the publishing options; and
    providing a publication history interface listing a history of publications including details and error information for a selected publication in the history.

2. The computer server of claim 1, wherein a resource is selected from the group consisting of computer systems, computer system components, data storage systems, switches, routers, memory, operating systems, software applications, and business services.

3. The computer server of claim 1, wherein the information in the database comprises information of resources reconciled from a plurality of sources of the computer network service.

4. The computer server of claim 1, wherein the act of searching comprises searching information in the database for at least one resource of the computer network service having one or more of the following characteristics:
    a resource that is in the service model,
    a resource that is not in the service model,
    a resource that has been published,
    a resource that has not been published,
    a resource that has or is substantially similar to a user-entered resource name,
    a resource that is a user-entered type of resource,
    a resource that is associated with a user-entered impact manager,
    a resource that was last published on a user-entered date, and
    a resource that was edited by a user-entered user name.

5. The computer server of claim 1, wherein the acts of receiving and searching comprise:
    receiving a user-entered search query having one or more logical or Boolean conditions relating resource attributes to attribute values; and
    searching information in the database for resource information that meets the user-entered search query.

6. The computer server of claim 1, wherein the act of creating comprises:
    receiving a user-entered selection of a resource found through searching; and
    performing one or more of:
        opening a graphical representation of the selected resource in a graphical workspace,
        placing a graphical representation of the selected resource in a selected graphical workspace,
        displaying editable properties of the selected resource, and
        publishing attributes of the selected resource directly to an associated impact manager.

7. The computer server of claim 1, wherein the act of creating comprises graphically arranging representations of resources in impact relationships relative to one another.

8. The computer server of claim 1, wherein the act of creating comprises:

graphically adding a visual representation of a resource to a visual representation of the service model from a template of predefined resources; and
automatically storing an instance of that resource in the database.

9. The computer server of claim 1, wherein the act of creating comprises:
receiving user-entered information associated with a resource in a graphical user interface; and
storing the user-entered information in the database,
wherein the user-entered information is selected from the group consisting of: a resources type, a name, a description, an owner, an associated impact manager, an indication whether the resource is in the service model, a permission, a priority, a cost, an alias name, a relationship to another resources, and an event associated with the resource.

10. The computer server of claim 1, wherein the act of initiating publishing comprises:
storing modifications to the service model in an isolated test dataset of the database; and
initiating distribution of modifications from the isolated test dataset to one or more test impact managers of the computer network service.

11. The computer server of claim 1, wherein the act of initiating publishing comprises graphically displaying modified resource information in the service model to be published compared to resource information previously published to the impact managers.

12. A non-transitory program storage device, readable by a programmable control device, comprising instructions stored on the non-transitory program storage device for causing the programmable control device to perform the acts of:
receiving at least one user-entered search criterion in a service model editor to locate information about one or more resources of a computer network service, wherein the service model editor comprises a graphical user interface (GUI);
searching information in a database based on the at least one user-entered search criterion to create a service model for managing the computer network service, the information in the database describing resources of the computer network service;
creating at least a portion of a service model of the computer network service in the service model editor using information obtained through searching;
enabling manipulation of at least the portion of the service model in the service model editor;
enabling user selection of different publishing options using the service model editor including an option to publish only selected objects of the service model;
providing a publishing preview interface using the service model editor including options to view objects to be published including object attributes and values for a selected object;
initiating publishing of at least a portion of the service model to one or more impact managers of the computer network service responsive to the user selection of the publishing options; and
providing a publication history interface listing a history of publications including details and error information for a selected publication in the history.

13. The non-transitory program storage device of claim 12, wherein a resource is selected from the group consisting of: computer systems, computer system components, data storage systems, switches, routers, memory, operating systems, software applications, and business services.

14. The non-transitory program storage device of claim 12, wherein the information in the database comprises information of resources reconciled from a plurality of sources of the computer network service.

15. The non-transitory program storage device of claim 12, wherein the act of searching comprises searching information in the database for at least one resource of the computer network service having one or more of the following characteristics:
a resource that is in the service model,
a resource that is not in the service model,
a resource that has been published,
a resource that has not been published,
a resource that has or is substantially similar to a user-entered resource name,
a resource that is a user-entered type of resource,
a resource that is associated with a user-entered impact manager,
a resource that was last published on a user-entered date, and
a resource that was edited by a user-entered user name.

16. The non-transitory program storage device of claim 12, wherein the acts of receiving and searching comprise:
receiving a user-entered search query having one or more logical or Boolean conditions relating resource attributes to attribute values; and
searching information in the database for resource information that meets the user-entered search query.

17. The non-transitory program storage device of claim 12, wherein the act of creating comprises:
receiving a user-entered selection of a resource found through searching; and
performing one or more of:
opening a graphical representation of the selected resource in a graphical workspace,
placing a graphical representation of the selected resource in a selected graphical workspace,
displaying editable properties of the selected resource, and
publishing attributes of the selected resource directly to an associated impact manager.

18. The non-transitory program storage device of claim 12, wherein the act of creating comprises graphically arranging representations of resources in impact relationships relative to one another.

19. The non-transitory program storage device of claim 12, wherein the act of creating comprises:
graphically adding a visual representation of a resource to a visual representation of the service model from a template of predefined resources; and
automatically storing an instance of that resource in the database.

20. The non-transitory program storage device of claim 12, wherein the act of creating comprises:
receiving user-entered information associated with a resource in a graphical user interface; and
storing the user-entered information in the database,
wherein the user-entered information is selected from the group consisting of a resources type, a name, a description, an owner, an associated impact manager, an indication of whether the resource is in the service model, a permission, a priority, a cost, an alias name, a relationship to another resources, and an event associated with the resource.

21. The non-transitory program storage device of claim 12, wherein the act of initiating publishing comprises:

storing modifications to the service model in an isolated test dataset of the database; and initiating distribution of modifications from the isolated test dataset to one or more test impact managers of the computer network service.

22. The non-transitory program storage device of claim 12, wherein the act of initiating publishing comprises graphically displaying modified resource information in the service model to be published compared to resource information previously published to the impact managers.

23. A computer network service modeling system, comprising:
   a database storing information describing resources of a computer network service; and
   a server functionally coupled to the database, the server having a graphical user interface application configured to:
   receive at least one user-entered search criterion about one or more resources of the computer network service to locate information about the one or more resources,
   search information in the database based on the at least one user-entered search criterion to create a service model for managing the computer network service,
   create at least a portion of a service model of the computer network service using information obtained through searching,
   enable manipulation of at least the portion of the service model in the graphical user interface application,
   enable user selection of different publishing options using the graphical user interface application including an option to publish only selected objects of the service model,
   provide a publishing preview interface using the graphical user interface application including options to view objects to be published including object attributes and values for a selected object,
   initiate publishing of at least a portion of the service model to one or more impact managers of the computer network service responsive to the user selection of the publishing options, and
   provide a publication history interface listing a history of publications including details and error information for a selected publication in the history.

24. The system of claim 23, wherein a resource is selected from the group consisting of: computer systems, computer system components, data storage systems, switches, routers, memory, operating systems, software applications, and business services.

25. The system of claim 23, wherein the information in the database comprises information of resources reconciled from a plurality of sources of the computer network service.

26. The system of claim 23, wherein to search, the graphical user interface application is configured to search information in the database for at least one resource of the computer network service having one or more of the following characteristics:
   a resource that is in the service model,
   a resource that is not in the service model,
   a resource that has been published,
   a resource that has not been published,
   a resource that has or is substantially similar to a user-entered resource name,
   a resource that is a user-entered type of resource,
   a resource that is associated with a user-entered impact manager,
   a resource that was last published on a user-entered date, and
   a resource that was edited by a user-entered user name.

27. The system of claim 23, wherein to receive and search, the graphical user interface application is configured to:
   receive a user-entered search query having one or more logical or Boolean conditions relating resource attributes to attribute values; and
   search information in the database for resource information that meets the user-entered search query.

28. The system of claim 23, wherein to create, the graphical user interface application is configured to:
   receive a user-entered selection of a resource found through searching; and
   perform one or more of:
      open a graphical representation of the selected resource in a graphical workspace,
      place a graphical representation of the selected resource in a selected graphical workspace,
      display editable properties of the selected resource, and
      initiate publishing of attributes of the selected resource directly to an associated impact manager.

29. The system of claim 23, wherein to create, the graphical user interface application is configured to graphically arrange representations of resources in impact relationships relative to one another.

30. The system of claim 23, wherein to create, the graphical user interface application is configured to:
   graphically add a visual representation of a resource to a visual representation of the service model from a template of predefined resources; and
   automatically store an instance of that resource in the database.

31. The system of claim 23, wherein to create, the graphical user interface application is configured to:
   receiving user-entered information associated with a resource; and
   store the user-entered information in the database,
   wherein the user-entered information is selected from the group consisting of: a resources type, a name, a description, an owner, an associated impact manager, an indication of whether the resource is in the service model, a permission, a priority, a cost, an alias name, a relationship to another resources, and an event associated with the resource.

32. The system of claim 23, wherein to initiate publishing, the graphical user interface application is configured to:
   store modifications to the service model in an isolated test dataset of the database; and
   initiate distribution of modifications from the isolated test dataset to one or more test impact managers of the computer network service.

33. The system of claim 23, wherein to initiate publishing, the graphical user interface application is configured to graphically display modified resource information in the service model to be published compared to resource information previously published to the impact managers.

* * * * *

UNITED STATES PATENT AND TRADEMARK OFFICE
CERTIFICATE OF CORRECTION

PATENT NO. : 8,862,631 B2  
APPLICATION NO. : 11/316025  
DATED : October 14, 2014  
INVENTOR(S) : Jean-Marc Trinon et al.

Page 1 of 1

It is certified that error appears in the above-identified patent and that said Letters Patent is hereby corrected as shown below:

On the title page, in item (57), in column 2, in "Abstract", line 2, Delete "f" after "server".

In the Claims

In column 18, line 60, In Claim 20, delete "of" and insert -- of: --, therefor.

Signed and Sealed this
Tenth Day of February, 2015

Michelle K. Lee
*Deputy Director of the United States Patent and Trademark Office*